United States Patent [19]

Wolfe

[11] 4,088,922
[45] May 9, 1978

[54] CERIUM MAGNESIUM ALUMINATE LUMINESCENT COMPOSITIONS, AND LAMPS UTILIZING SAME

[75] Inventor: Robert W. Wolfe, Wysox, Pa.
[73] Assignee: GTE Sylvania Incorporated, Stamford, Conn.
[21] Appl. No.: 718,801
[22] Filed: Aug. 30, 1976
[51] Int. Cl.$^2$ .......................... C09K 11/46; H01J 1/63
[52] U.S. Cl. .............................. 313/486; 252/301.4 R
[58] Field of Search .................. 252/301.4 R; 313/486

[56] References Cited

U.S. PATENT DOCUMENTS 3,597,365   8/1971   Ward ............................. 252/301.4 R

FOREIGN PATENT DOCUMENTS 2,353,943   5/1974   Germany ...................... 252/301.4 R

OTHER PUBLICATIONS

Ranby et al. "Chem. Abstracts" vol. 83, 1975, p. 155577f.

*Primary Examiner*—Jack Cooper
*Attorney, Agent, or Firm*—J. C. Fox

[57] ABSTRACT

Cerium magnesium aluminate luminescent compositions containing from about 1.25 to about 6.25 mole percent of cerium oxide, from about 1.25 to about 6.25 mole percent of magnesium oxide and from about 87.5 to about 97.5 mole percent of aluminum oxide and compositions containing from about 1.25 to about 4.5 mole percent of cerium oxide, from about 6.25 to 14 mole percent of magnesium oxide and from about 81.5 to about 92.5 mole percent of aluminum oxide, the percentage being calculated on the basis of $CeO_{1.5}$, MgO and $AlO_{1.5}$, are efficient ultraviolet light emitting materials when excited by 254 nanometer energy. Up to 50 mole percent of the cerium oxide (on a $CeO_{1.5}$ basis) content can be replaced by an equivalent molar amount of strontium oxide, calcium oxide or barium oxide. The materials are self-activating due to the presence of trivalent cerium. The good temperature dependence of these materials and their emission characteristics enable the production of high quality lamps useful for the treatment of psoriasis as well as conventional high loaded fluorescent lamps.

3 Claims, 4 Drawing Figures

CERIUM MAGNESIUM ALUMINATE LUMINESCENT COMPOSITIONS, AND LAMPS UTILIZING SAME

BACKGROUND OF THE INVENTION

1. Field of the Invention

This invention relates to cerium-magnesium aluminate luminescent materials. More particularly it relates to ultraviolet emitting luminescent materials when excited by 254 nanometer energy, processes for making the materials and lamps utilizing these materials.

2. Prior Art

Verstegen et al in *J. Luminescent* 6 425 (1973) and in Belgian Pat. No. 7,214,862 disclose the compound, $CeMgAl_{11}O_{19}$, having the magnetoplumbite structure. The above Belgian patent discloses the materials in the triangle labeled ABC in FIG. 1. The materials within that area can be described by the formula:

$$Ce_xMg_yAl_{11}O_{16.5 + 1.5x + z}$$

wherein $x$ is from about 0.95 to about 5.5 and $y$ is from 0 to about 5.5 or alternatively expressed in terms of molar percentages as the cerium oxide content (on a $CeO_{1.5}$ basis) varies from about 8 to about 33 mole percent, the magnesium oxide (on a MgO basis) varies from about 0 to 33 mole percent and the aluminum oxide content (on a $AlO_{1.5}$ basis) varies from about 67 to about 92 mole percent.

The compound, $CeMgAl_{11}O_{19}$, has a peak emission at about 373 nanometers when subjected to 254 nanometer excitation. The materials containing the relatively high percentages of $CeO_2$ and MgO in the system lose brightness quite rapidly at elevated temperatures. For example, the intensity or brightness of $CeMgAl_{11}O_{19}$ (about 7.7 mole percent $CeO_{1.5}$ and about 7.7 mole percent MgO) steadily drops above about 125° C and at 400° C is only about 35% of its maximum intensity or brightness.

It is believed that a new family of materials in the $CeO_2 \cdot MgO \cdot Al_2O_3$ system having an improved temperature dependence and in which up to 50 mole percent of the $CeO_2$ can be replaced with an alkaline earth oxide, RO, wherein R is selected from Sr, Ca and Ba, would be an advancement in the art. It is also believed that lamps utilizing the above-mentioned luminescent materials which can be operated at wall temperatures up to the 300° C to 400° C range would be an advancement in the art.

OBJECTS AND SUMMARY OF THE INVENTION

It is an object of this invention to provide a new family of luminescent materials.

It is an object of this invention to provide an improved fluorescent lamp.

It is a further object of this invention to provide a family of luminescent materials which emit ultraviolet light and maintain a high level of intensity at relatively high temperatures.

It is still another object of this invention to provide an in situ process wherein the oxides of trivalent cerium, magnesium and aluminum are formed to provide a self-activated luminescent material.

These and other additional objects are achieved in one aspect of this invention by two families of luminescent compounds that can be represented by the formula:

$$Ce_xMg_yAl_{11}O_{16.5 + 1.5x + y}$$

wherein $x$ and $y$ are from about 0.14 to about 0.78 and $$Ce_aMg_bAl_{11}O_{16.5 + 1.5a + b}$$

wherein $a$ is from about 0.14 to about 0.78 and $b$ is from about 0.62 to about 1.87. Additionally, from 0 to about 50 molar percent of the cerium oxide can be replaced with a molar equivalent amount of an oxide selected from BaO, SrO and CaO. In an additional aspect of the invention reactive sources of cerium, magnesium and aluminum having the desired atomic ratio of metallic elements and an oxygen level sufficient to provide an amount of reactive oxygen equal to 1.5 (Ce + Al) and (1 × Mg) on an atomic basis are blended to form a relatively uniform admixture. The admixture is thereafter heated under controlled time and temperature conditions in either a reducing or a non-oxidizing atmosphere. If BaO, SrO, and CaO containing materials are produced reactive raw materials are added at the time the admixture is prepared.

In an additional embodiment there is provided a lamp comprising an envelope having a pair of opposing electrodes at either sealed end of the envelope, a fill of an ionizable gas inside the envelope that will produce 254 nanometer energy and a coating of either of the above-described cerium magnesium aluminates on the inner surface of the envelope.

DESCRIPTION OF THE PREFERRED EMBODIMENTS

For a better understanding of the present invention, together with other and further objects, advantages and capabilities thereof, reference is made to the following disclosure and appended claims in connection with the above-described drawings.

The phosphors of this invention are more efficient than the compound, $CeMgAl_{11}O_{19}$, and have two other important characteristics. The emission peak under 254 nanometer excitation can be varied from 353 to 370 nanometers and maintain a relatively high level of intensity at elevated temperatures.

Figure 1:
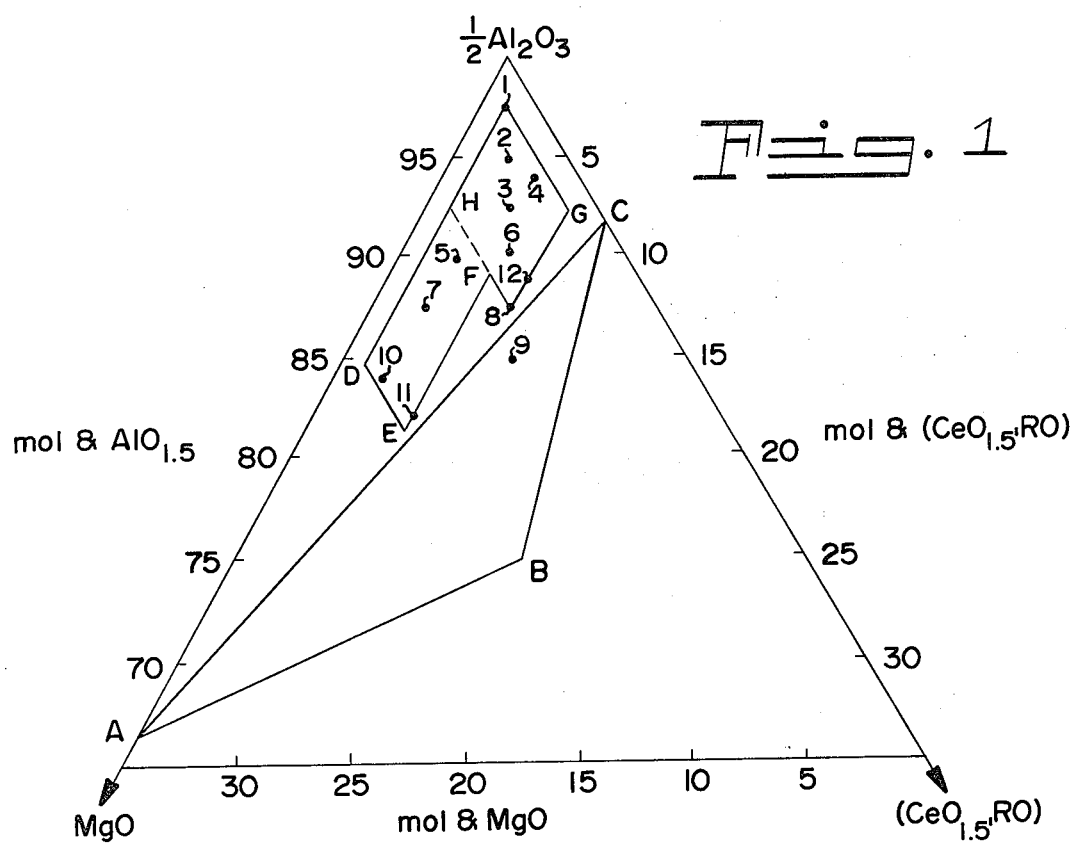
FIG. 1 is a portion of the pseudo-ternary diagram representing the $(CeO_{1.5}, RO) \cdot AlO_{1.5} \cdot MgO$ system.

With particular reference to FIG. 1 a portion of a pseudo-ternary diagram is shown. The term "pseudo-ternary" is used because for convenience, the cerium oxide and alkaline earth oxide are shown as a single component in order to employ a two-dimensional diagram. The compositions of this invention lie within the area 1 G 8 F E D H in FIG. 1. Alternatively, the invention can be expressed in terms of two distinct families of compositions. The preferred compositions are those encompassed within the diamond shape area illustrated in FIG. 1 as the area 1 G 8 H. These preferred compositions can be stated as consisting essentially of 87.5 to 97.5 mole percent of aluminum oxide, on an $AlO_{1.5}$ basis, from about 1.25 to about 6.25 mole percent of magnesium oxide, on an MgO basis, and from 1.25 to 6.25 mole percent of ($CeO_{1.5}$ + RO) wherein R is an alkaline earth metal selected from Ba, Ca and Sr and the RO content varies from 0 to 50 mole percent of the $CeO_{1.5}$ content. An additional form of expressing the invention is by the formula:

$$Ce_{x-z}R_zMg_yAl_{11}O_{16.5 + 1.5x + y + z}$$

wherein R is selected from Ba, Ca and Sr and $x$ and $y$ are from about 0.14 to about 0.79 and $z$ is from 0 to about 0.5.

The second family of compounds are not preferred because of a slightly reduced brightness but are relatively stable at higher temperatures and thus can be used. The non-preferred compositions of this invention are bounded by the lines DH, DE, EF and FH in FIG. 1. Alternatively, these compositions consist essentially of from about 81.5 to about 92.5 mole percent of aluminum oxide, on a $AlO_{1.5}$ basis, from about 6.25 to about 14 mole percent of magnesium oxide on a MgO basis and from about 1.25 to about 4.5 mole percent of $CeO_{1.5}$ + RO where R is Ba, Ca or Sr.

Another method of expressing these compounds is by the formula:

$$Ce_{a-c}R_cMg_bAl_{11}O_{16.5 + 1.5a + b + c}$$

wherein R is selected from Ba, Ca and Sr $a$ is from about 0.14 to about 0.62 $b$ is from about 0.79 to about 1.87 and $c$ is from 0 to 0.5$a$.

Figure 3:
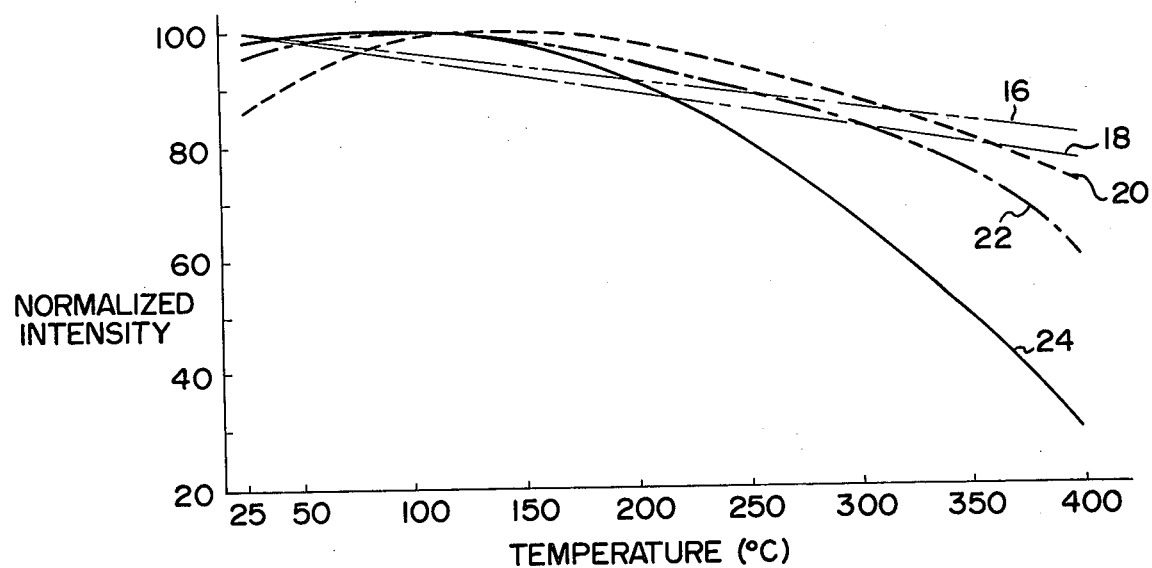
FIG. 3 shows the temperature dependence curves of five phosphors from the temperatures of 25° to 400° C.

Temperature stability (referred to in the art as temperature dependence) of these luminescent compositions of this invention is improved by the addition of the above alkaline earth metal oxides designated by R in the formulas. FIG. 3 illustrates the effect of elevated temperatures upon the intensity of emission. The "normalized" intensity refers to the maximum intensity or brightness of the emission under 254 nanometer excitation as 100%. Line 16 shows an emission intensity decrease from maximum at room temperature to about 80% of that intensity at 400° C. The phosphor tested is represented by the formula, $Ce_{0.486}Ca_{0.3}Mg_{0.611}Al_{11}O_{17.5}$. The following Table illustrates the formulas of the phosphors tested, their temperatures at maximum emission and the % of that emission at 200° C, 300° C and 400° C.

if the wall temperatures are in the range of 200° C to 300° C the $Ce_{x-z}Ba_zMg_yAl_{11}O_{16.5 + 1.5x + y + z}$ type yield the maximum amount of retained intensity while at the 300°–400° C the $Ce_{x-z}Ca_zMg_yAl_{11}O_{16.5 + 1.5x + y + z}$ type of phosphors yield the best temperature dependence.

The luminescent materials are self-activating due to the presence of trivalent cerium in the host lattice. Thus in the process of this invention for producing the phosphors, it is necessary that a firing atmosphere be provided to insure that (a) the cerium is in the trivalent state and (b) sufficient reactive oxygen is present in the raw material sources to provide 1.5 atoms of oxygen for each atom of cerium and aluminum plus one atom for each atom of magnesium and the alkaline earth metal of Ca, Ba or Sr. If cerium dioxide, $CeO_2$, is to be used as a source for cerium, however, a reducing atmosphere is preferably used to reduce the cerium to its trivalent state. The fluoride salts such as $CeF_3$, $CaF_3$ and the like can be used in conjunction with aluminum hydroxide as the source for oxygen for both the aluminum and the other metal ions. The hydrogen will react to form hydrogen fluoride which is evolved from the mass. Thus the sources for the various metals of Ce, Mg, Ca, Ba and Sr can be the respective oxides and hydroxides or the respective reactive salts of the metals. By "reactive" as used herein it is meant that the salts will decompose in a neutral atmosphere at a temperature of about 1200° C into the metal ion and the anion will either form a volatile gas or a compound with hydrogen that evolves from the reaction mass. Aluminum oxide can be used although aluminum hydroxide is the preferred source for aluminum oxide. In any event there must be sufficient reactive "oxygen" in the reactive mass to form an oxide with the trivalent cerium and aluminum and divalent magnesium and the divalent alkaline earth metals of Ba, Ca, or Sr, if present.

The process of this invention therefore comprises, first forming a relatively uniform admixture of reactive sources of cerium, magnesium, aluminum by blending solid materials such as metal halogen salts, oxides, or hydroxides. The admixture has the appropriate ratio of metals, that is for the preferred compositions, when Ba, Ca, or Sr are not partially substituted for Ce, when the Ce to Mg atomic ratio is from about 1:5.3 to about 5.3:1 and the Ce:Al and the Mg:Al atomic ratios are from about 1:14 to about 1:78. For the less preferred compositions, when Ba, Ca, or Sr are not partially substituted

TABLE A

| Line | Formula | Temp. at Maximum | % of Max. at 200° C | % of Max. at 300° C | % of Max. at 400° C |
|---|---|---|---|---|---|
| 16 | $Ce_{0.486}Ca_{0.3}Mg_{0.611}Al_{11}O_{17.5}$ | Room | 92 | 86 | 82 |
| 18 | $Ce_{0.586}Sr_{0.2}Mg_{0.611}Al_{11}O_{17.5}$ | Room | 88 | 83 | 76 |
| 20 | $Ce_{0.586}Ba_{0.2}Mg_{0.611}Al_{11}O_{17.5}$ | 130° C | 98 | 88 | 74 |
| 22 | $Ce_{0.611}Mg_{0.611}Al_{11}O_{18}$ | 125° C | 95 | 84 | 60 |
| 24 | $CeMgAl_{11}O_{19}$ | 125° C | 92 | 68 | 30 |

As can be seen the present invention enables the selection of a phosphor to yield a lamp that will maintain the maximum amount of its intensity depending upon the wall operating temperature of a lamp. For example, for Ce the atomic ratios are as follows: Ce:Mg = from about 1:1.24 to about 1:13.3, Mg:Al = from about 1:6 to about 1:14 and Ce:Al = from about 1:18 to about 1:78.

When Ba, Ca, or Sr are substituted for Ce the replacement is done on an equivalent basis, that is, the admixture can have up to a 1:1 atomic ratio of Ce to the alkaline earth selected from Ba, Ca, or Sr. After the relatively uniform admixture of raw materials having the proper metallic atomic ratios and the desired oxygen content are formed, the mixture is heated to a temperature of from about 1300° C to about 1750° C for a period of 1 to about 12 hours. Higher temperatures require shorter times and lower temperatures require the longer time. The atmosphere will be a reducing atmosphere comprised of at least 5 volume percent hydrogen, the balance nitrogen, if the cerium source is a $Ce^{4+}$ source. If the cerium source is a $Ce^{3+}$ source then an inert atmosphere may be used, however, a nitrogen-hydrogen mixture containing at least 5 volume percent hydrogen is preferred to insure that essentially all of the cerium is reduced to the trivalent state. It is normal practice to use an atmosphere made up of 70 volume percent hydrogen and 30 volume percent nitrogen when synthesizing phosphors of this invention. This is done to insure protection for the heating elements of the furnace. All examples of phosphors prepared according to this invention were prepared under 70% $H_2$, 30% $N_2$ atmosphere. Although 100% $H_2$ atmosphere may equally well be used, it is costly. The phosphor, after firing, is screened in a conventional manner.

Figure 4:
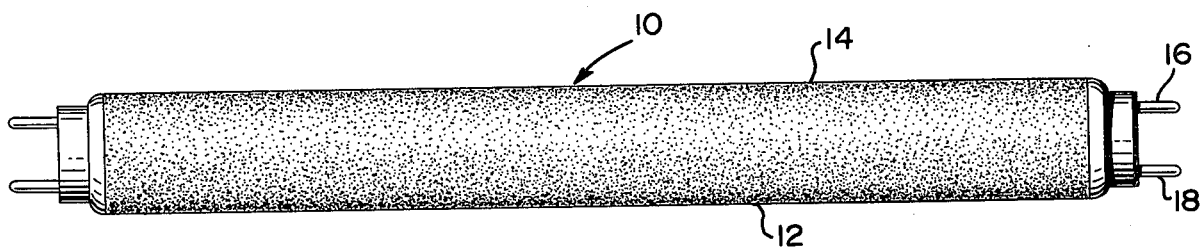
FIG. 4 is a fluorescent lamp of this invention.

Fluorescent lamps produced from the luminescent materials of this invention are manufactured by the conventional process that is well known in the art. As is illustrated in FIG. 4, and as is known in the art, a fluorescent lamp comprises an envelope, a pair of opposing electrodes at either end of the envelope, a fill of ionizable gas and mercury inside the envelope to yield 254 nanometer radiation and a coating of the luminescent materials inside the envelope.

To more fully illustrate the subject invention, the following detailed examples are presented. All parts, proportions, and percentages are by weight unless otherwise indicated.

EXAMPLE I

Figure 2:
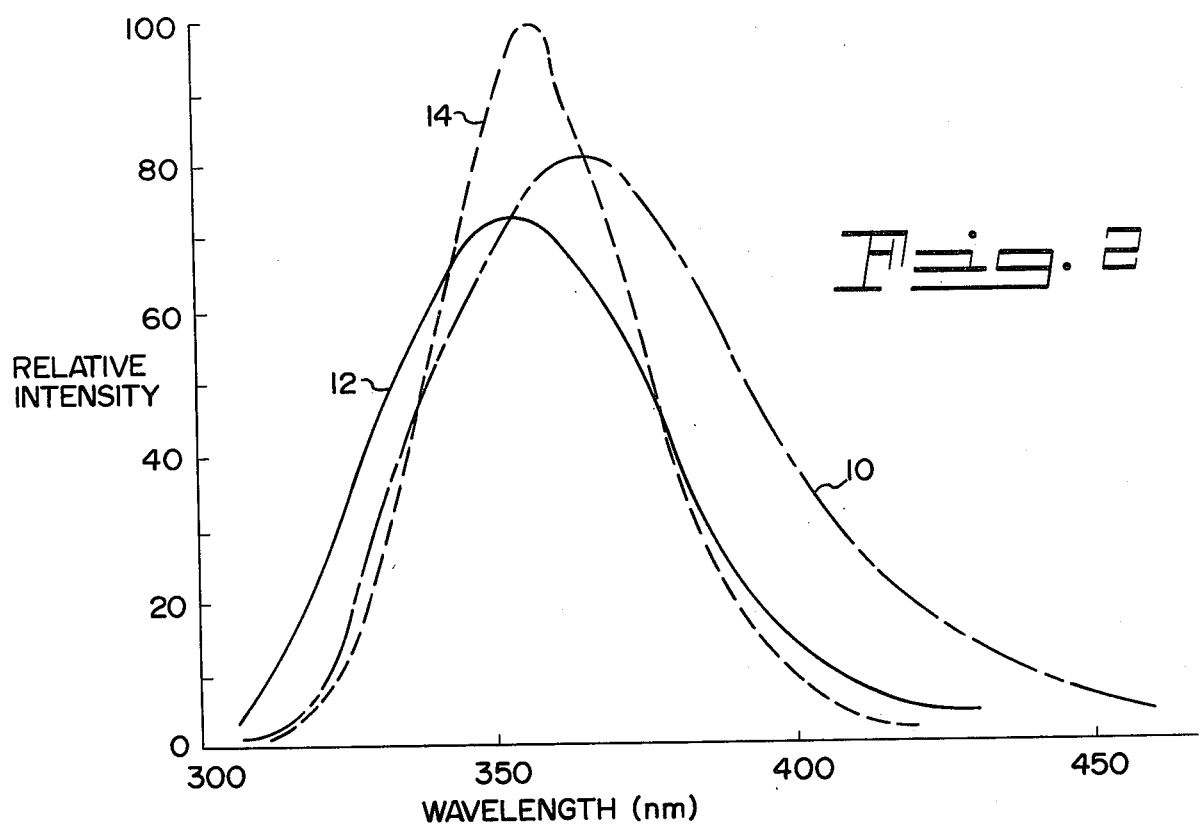
FIG. 2 illustrates the emission spectra under 254 nanometer excitation of two phosphors of this invention compared to a standard lead-activated barium disilicate.

About 1.85 parts of $CeF_3$, about 0.38 parts of MgO are mixed with about 13.2 parts of $Al(OH)_3$. The resulting phosphor is fired at about 1450° C for about four hours in a reducing atmosphere. The resulting phosphor, $Ce_{0.611}Mg_{0.611}Al_{11}O_{18.1}$ is comprised of about 80% magnetoplumbite phase and about 20% alpha alumina phase. This phosphor luminesces brightly under UV excitation with a peak maximum at 367±5 nm. (Curve 10 in FIG. 2) and maintains excellent luminescent efficiency to 320° C, at which temperature the brightness is reduced to 80% of the room temperature value. (Line 22 in FIG. 3)

EXAMPLE 2

About 1.29 parts of $CeO_2$, about 0.36 parts of $CaF_2$, about 0.379 parts of MgO are blended with about 13.2 parts of $Al(OH)_3$ to form a relatively uniform admixture. The admixture is fired at 1450° C for about four hours in a reducing atmosphere. The resulting $Ce_{0.486}Ca_{0.3}Mg_{0.611}Al_{11}O_{17.5}$ is comprised of about 100% of magnetoplumbite phase. The phosphor luminesces brightly under UV excitation with a peak maximum at 353±5 nm. (Curve 14 in FIG. 2) and maintains excellent luminescence efficiency to over 400° C, at which temperature the brightness is reduced to about 80% of the brightness at ambient condition. (Line 16 in FIG. 3) The brightness of phosphor composition $CeMgAl_{11}O_{19}$ is reduced to 80% of ambient brightness at only 250° C (Line 24 in FIG. 4).

EXAMPLE 3

Following the procedure in Examples 1 and 2, 14 samples are prepared. Table I gives the details of the compositions produced and the compositions of these materials are plotted in FIG. 1 and labeled as Nos. 1–12.

TABLE I

Composition, Relative Brightness, Peak Wavelength and Phase Assemblages for Points Shown in FIG. 1.

| No. in FIG. 1 | Composition $CeO_{1.5}$ + RO (Mol %) | MgO | $\frac{1}{2}Al_2O_3$ | Host Molar Formula | Relative Brightness | Peak Maximum Nanometers | Phase Assembly |
|---|---|---|---|---|---|---|---|
| 1 | 1.25 | 1.25 | 97.5 | $Ce_{.141}Mg_{.141}Al_{11}O_{16.8}$ | 89 | 370 ± nmm | 25A, 75α |
| 2 | 2.5 | 2.5 | 95 | $Ce_{.289}Mg_{.289}Al_{11}O_{17.2}$ | 97 | 367 | 40A, 60α |
| 3 | 3.75 | 3.75 | 92.5 | $Ce_{.446}Mg_{.446}Al_{11}O_{17.6}$ | 99 | 367 | 60A, 40α |
| 4 | 4 | 2 | 94 | $Ce_{.468}Mg_{.234}Al_{11}O_{17.4}$ | 98 | 367 | 50A, 50α |
| 5 | 2.5 | 7.5 | 90 | $Ce_{.306}Mg_{.917}Al_{11}O_{17.8}$ | 84 | 365 | 30A, 40α |
| 6 | 5 | 5 | 90 | $Ce_{.611}Mg_{.611}Al_{11}O_{18.0}$ | 100 | 367 | 80A, 20α |
| 7 | 2.5 | 10 | 87.5 | $Ce_{.314}Mg_{1.257}Al_{11}O_{18.2}$ | 92 | 364 | 40A, 30α |
| 8 | 6.25 | 6.25 | 87.5 | $Ce_{.786}Mg_{.786}Al_{11}O_{18.5}$ | 99 | 367 | 95A, 5α |
| 9 | 7.69 | 7.69 | 84.6 | $CeMgAl_{11}O_{19}$ | 95 | 372 | 100A |
| 10 | 2.4 | 13.7 | 83.9 | $Ce_{.314}Mg_{1.8}Al_{11}O_{18.8}$ | 94 | 362 | 40A, 60S |
| 11 | 4.5 | 13.5 | 82.0 | $Ce_{.611}Mg_{1.8}O_{19.2}$ | 97 | 368 | 75A, 25S |
| 12 | 6.34 | 4.92 | 88.74 | $Ce_{.586}Ba_{.2}Mg_{.611}Al_{11}O_{17.6}$ | 98 | 359 | 95A, 5α |
| 12 | 6.34 | 4.92 | 88.74 | $Ce_{.586}Sr_{.2}Mg_{.611}Al_{11}O_{17.6}$ | 90 | 356 | 95A, 5α |
| 12 | 6.34 | 4.92 | 88.74 | $Ce_{.486}Ca_{.3}Mg_{.611}Al_{11}O_{17.5}$ | 90 | 353 | 100A |

*Numbers assigned to phases detected by powder x-ray diffraction are based on relative peak heights and are qualitative; α = alpha alumina, A = magnetoplumbite, S = spinel.

EXAMPLE 4

As further examples demonstrating advantages, for UV source application; of phosphors according to this invention over the most efficient state-of-the-art phosphor $BaSi_2O_5$:Pb and the composition $CeMgAl_{11}O_{19}$ reported by Verstegen et al[4]; the following lamp test data are presented:

TABLE II

| No. in FIG. 1 | Composition | Peak* Wavelength (nm) | Initial Power In Watts Between 320 – 380 nm | Power In Watts Between 320 – 380 After 500 Hrs. Burning | 0 – 500 Hrs. % Maintenance |
|---|---|---|---|---|---|
| 6 | $Ce_{.611}Mg_{.611}Al_{11}O_{18}$ | 352 | 7.57 | 6.31 | 83.4 |
| 11 | $Ce_{.611}Mg_{1.800}Al_{11}O_{19.2}$ | 353 | 7.32 | 5.96 | 81.4 |
| 12 | $Ce_{.586}Sr_{.2}Mg_{.611}Al_{11}O_{17.6}$ | 341 | 8.55 | 7.70 | 90.1 |
| 12 | $Ce_{.486}Sr_{.3}Mg_{.611}Al_{11}O_{17.5}$ | 338 | 8.02 | 6.94 | 86.5 |

TABLE II-continued

| No. in FIG. 1 | Composition | Peak* Wavelength (nm) | Initial Power In Watts Between 320 – 380 nm | Power In Watts Between 320 – 380 After 500 Hrs. Burning | 0 – 500 Hrs. % Maintenance |
|---|---|---|---|---|---|
| 12 | $Ce_{.586}Ba_2Mg_{.611}Al_{11}O_{17.6}$ | 344 | 8.88 | 7.67 | 86.4 |
| 12 | $Ce_{.486}Ca_3Mg_{.611}Al_{11}O_{17.5}$ | 338 | 6.97 | 6.27 | 89.9 |
| 9 | $CeMgAl_{11}O_{19}$ | 365 | 5.44 | 4.44 | 81.5 |
| Control Phosphor | $BaSi_2O_5:Pb$ | 352 | 9.17 | 6.46 | 70.4 |

*These values are obtained from phosphor fabricated in lamps and corrected for instrument errors. They show a small systematic difference from the uncorrected values reported in Table I. Table II values are thus more accurate.

Table II shows the advantages of phosphors according to this invention with respect to brightness, maintenance and the capability of matching UV output (peak wavelength) to an application requirement over the current most efficient UV phosphor $BaSI_2O_5:Pb$ and the previously known $CeMgAl_{11}O_{19}$.

While there has been shown and described what are at present considered the preferred embodiments of the invention, it will be obvious to those skilled in the art that various changes and modifications may be made therein without departing from the scope of the invention as defined by the appended claims.

What is claimed is:

1. An ultraviolet light emitting phosphor composition consisting essentially of a material represented by the formula, $$Ce_{x-z}R_zMg_yAl_{11}O_{16.5 + 1.5x + y + z}$$

wherein R is selected from Ba, Ca and Sr and x and y are from about 0.14 to about 0.79 and z is a positive number to about 0.5x, whereby the amount of $R_z$ is sufficient to improve the temperature stability of the intensity of emission of a lamp having a 254 nanometer radiation incorporating such composition when said lamp is operating in the range of from about 25° C to about 400° C.

2. An ultraviolet light emitting phosphor composition consisting essentially of a material represented by the formula, $$Ce_{a-c}R_cMg_bAl_{11}O_{16.5 + 1.5a + b + c}$$

wherein R is selected from Ba, Ca and Sr, a is from about 0.14 to about 0.62, b is from about 0.79 to about 1.87 and c is a positive number to about 0.5a, whereby the amount of $R_c$ is sufficient to improve the temperature stability of the intensity of emission of a lamp having 254 nanometer radiation source and, incorporating such composition when said lamp is operating in the range of from about 25° C to about 400° C.

3. A lamp emitting ultraviolet light comprising:
 (a) an envelope,
 (b) a pair of opposing electrodes sealed at either end of the envelope,
 (c) a fill of ionizable gas capable of producing 254 nanometer energy inside said envelope, and
 (d) a coating on the inner surface of said envelope of an ultraviolet emitting phosphor composition consisting essentially of a material represented by the formula, $$Ce_{x-z}R_zMg_yAl_{11}O_{16.5 + 1.5x + y + z}$$

wherein R is selected from Ba, Ca and Sr and x and y are from about 0.14 to about 0.79 and z is a positive number to about 0.5x, whereby the amount of $R_z$ is sufficient to improve the temperature stability of the intensity of emission of said lamp when operating in the range of from about 25° C to about 400° C.

* * * * *